United States Patent
Venturini

(10) Patent No.: US 8,671,794 B2
(45) Date of Patent: Mar. 18, 2014

(54) MANUAL DEVICE FOR CONTROLLING BRAKE AND ACCELERATOR OF A VEHICLE

(75) Inventor: Fabrizio Venturini, Rome (IT)

(73) Assignee: Guidosimplex S.R.L., Rome (IT)

( * ) Notice: Subject to any disclaimer, the term of this patent is extended or adjusted under 35 U.S.C. 154(b) by 0 days.

(21) Appl. No.: 13/496,414

(22) PCT Filed: Sep. 14, 2010

(86) PCT No.: PCT/IT2010/000391
§ 371 (c)(1),
(2), (4) Date: Apr. 6, 2012

(87) PCT Pub. No.: WO2011/033547
PCT Pub. Date: Mar. 24, 2011

(65) Prior Publication Data
US 2012/0272767 A1 Nov. 1, 2012

(30) Foreign Application Priority Data
Sep. 16, 2009 (IT) .............................. RM2009Q0471

(51) Int. Cl.
*G05G 11/00* (2006.01)
*G05G 13/00* (2006.01)
(52) U.S. Cl.
USPC .......................................................... 74/481
(58) Field of Classification Search
USPC ................................. 74/481, 473.1
See application file for complete search history.

(56) References Cited

U.S. PATENT DOCUMENTS

| 4,998,983 | A | * | 3/1991 | Ruprecht et al. | 477/209 |
| 5,025,905 | A | * | 6/1991 | Lenz | 477/209 |
| 5,129,492 | A | * | 7/1992 | Lenz et al. | 477/27 |

(Continued)

FOREIGN PATENT DOCUMENTS

| DE | 10140187 | 3/2003 |
| DE | 102004050067 | 4/2006 |
| DE | 102005046318 | 3/2007 |
| WO | 2006051532 | 5/2006 |

OTHER PUBLICATIONS

International Search Report for PCT/IT2010/000391, Completed by the European Patent Office on Dec. 7, 2010, 2 Pages.

*Primary Examiner* — Justin Krause
(74) *Attorney, Agent, or Firm* — Hershkovitz & Associates PLLC; Abraham Hershkovitz

(57) ABSTRACT

A manual device for controlling brake and accelerator of a vehicle, a device having a body coupled with the vehicle and remaining substantially standstill while the device is used. The device includes a first lever provided with an upper handgrip projecting from inside the body and movable independently with respect to the same, a second lever and a third lever and a frame the first lever being pivoted on the frame in a substantially central position. When the user exerts an action on a handgrip it can be displaced forward or backward, the second lever being pivoted above on a frame in correspondence of one of its ends the upper part of the first lever shaped not to interfere with the second lever as an upper kinematic torque, the third lever being pivoted at the bottom of the frame in correspondence of one of its ends lower end of the first lever being so shaped to interfere with the lever, as an upper kinematic torque, free end of the second lever being coupled with brake and free end of the third lever being coupled with accelerator.

6 Claims, 2 Drawing Sheets

(56) References Cited

U.S. PATENT DOCUMENTS

| | | | |
|---|---|---|---|
| 5,197,347 A * | 3/1993 | Moffitt et al. | 74/481 |
| 5,282,522 A * | 2/1994 | Grindle | 477/209 |
| 5,813,944 A * | 9/1998 | Grindle | 477/209 |
| 7,062,988 B2 * | 6/2006 | Laukkanen | 74/480 R |
| 2009/0056491 A1 | 3/2009 | Fruehling | |

* cited by examiner

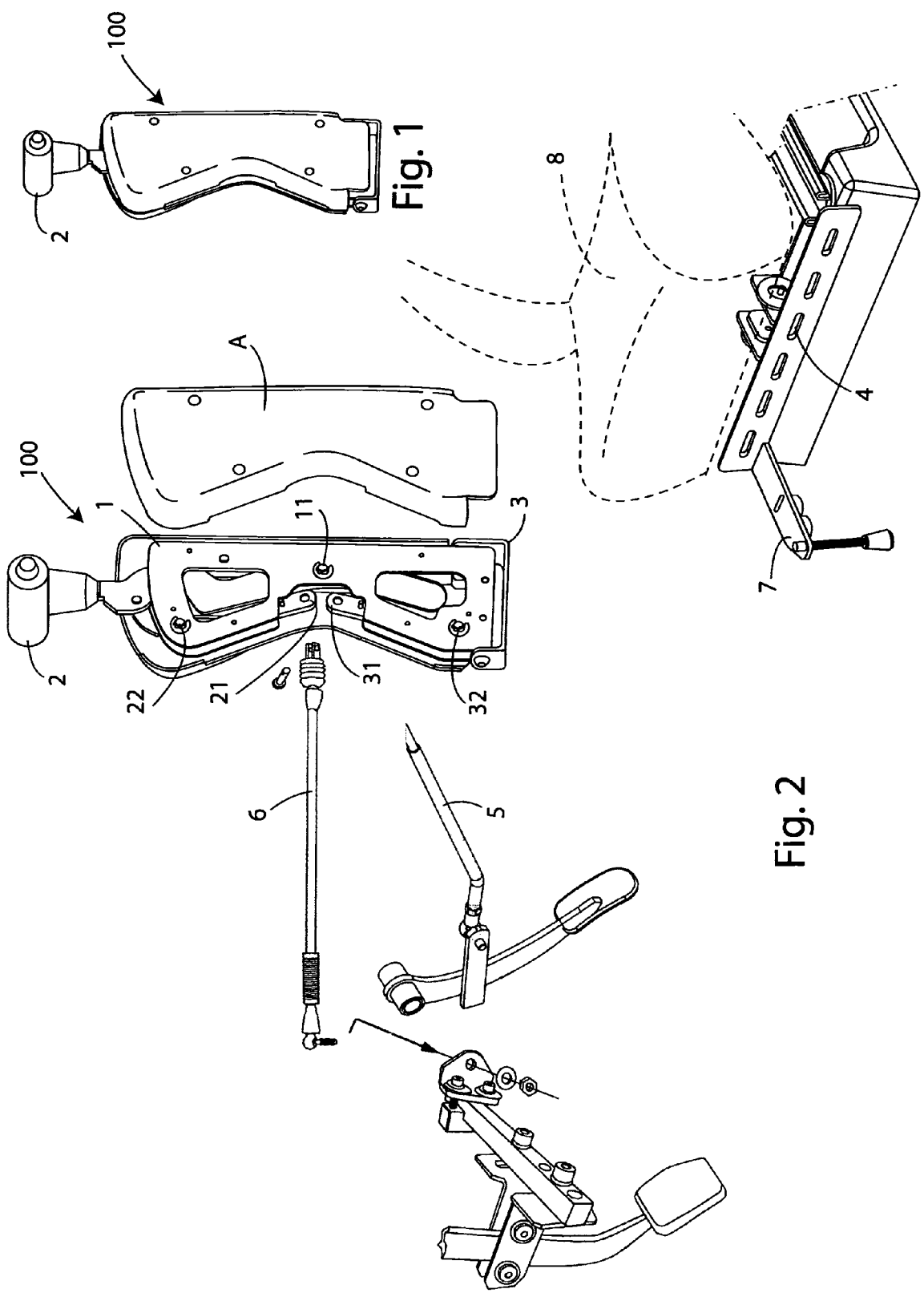

MANUAL DEVICE FOR CONTROLLING BRAKE AND ACCELERATOR OF A VEHICLE

CROSS-REFERENCE TO RELATED APPLICATION

This application is the U.S. national phase of PCT Application No. PCT/IT2010/000391 filed on Sep. 14, 2010, which claims priority to Italian application RM2009Q000471 filed on Sep. 16, 2009, the disclosures of which are incorporated in their entirety by reference herein.

FIELD OF THE INVENTION

The present invention concerns a manual device for controlling brake and accelerator of a vehicle. More specifically, the invention relates to a manual device comprising three lever pivoted at different points of a frame and interacting so as to adjust braking and acceleration of a vehicle by movement of a single knob.

BACKGROUND OF THE INVENTION

As it is well known in the field of devices for helping disabled persons to drive vehicles, different devices exist for manually controlling acceleration and braking action. Such devices generally comprise a plurality of levers that are connected with pedal operation levers, occupying space within the passenger compartment. In order to reduce dimensions of the device, the levers are usually provided in a lowered position, and thus levers and connection can rub against the driver's legs or elements of the car, such as the seat. Further, if the driver acts on pedals by using his or her lower limbs, the connection rods transmit the movement to the manual control levers. In order to obviate to said drawback, the connection rods must be telescopic rods, which are more difficult to make and reduce the strength of the whole device.

Thus, the needing exists for a manual control device which is small, permits actuation of two controls by a single element, and can be installed so as not to hinder driver movements, or rubbing against cart parts, and, finally, permits using rigid rods ensuring a best solidity of the structure.

SUMMARY OF THE INVENTION

Therefore, it is an object of the present invention to provide a manual control device having small dimensions, permitting a single element to actuate two controls.

It is a further object of the invention that the manual control device can be installed so as not to hinder driver movements, or rub against cart parts.

It is a further object of the invention to permit the use of rigid rods to provide the best solidity of the structure.

It is therefore a specific object of the present invention to provide a manual device for controlling the brake and the accelerator of a vehicle, said device comprising a body, coupled with the vehicle and remaining substantially standstill while the device is used, and within which there are provided a first lever provided with an upper handgrip projecting from inside said body, and movable independently with respect to the same, a second lever and a third lever, and a frame, said first lever being pivoted on the frame in a substantially central position, so that, if user exerts an action on said handgrip, it can be displaced forward or backward, said second lever being pivoted above on said frame, in correspondence of one of its ends, the upper part of the first lever being so shaped not to interfere with said second lever, as an upper kinematic torque, said third lever being pivoted at the bottom of said frame, in correspondence of one of its ends, lower end of said first lever being so shaped to interfere with said lever, as an upper kinematic torque, free end of the second lever being coupled with brake operation means, and free end of the third lever being coupled with accelerator operation means.

The main innovative feature that accomplishes the objects of the present invention is that the accelerator and brake levers are placed within a housing to ensure that when controlling the brake and accelerator levers, a leg contraction will not interfere with the driver's control of the brake and accelerator lever. At the same time, the housing acts both as an anchoring and as lever, and all other accessories, thus creating set self-supporting and limited dimensions within the vehicle.

Preferably, according to the invention, said second lever and said third lever are provided with return elastic means, particularly a spring, aiming to bring then in a rest or neutral position.

Still according to the invention, said device is provided with a bracket for attachment to the vehicle, particularly a bracket that can be inserted within holes provided into the seat frame.

Furthermore, according to the invention, said frame provides two elements, placed aside the lever assembly.

Preferably, according to the invention, acceleration is obtained by pulling said first lever backward, while braking action is by pushing said first lever forward.

Advantageously, said handgrip can be provided with other controls, such as, for example, a brake blocking button, horn, of light operating controls.

Furthermore, according to the invention, said device can be horizontally provided under the steering wheel.

BRIEF DESCRIPTION OF THE DRAWINGS

The invention will be now described for illustrative, but not limitative purposes, with reference to the figures of the enclosed drawings, according to one preferred embodiment. Particularly:

FIG. 1 is an axonometric view of manual device according to the invention;

FIG. 2 schematically shows, partially in an exploded view, the manual device according to the invention and its system for anchoring to the vehicle elements;

DETAILED DESCRIPTION OF THE PREFERRED EMBODIMENT

Figure 4:
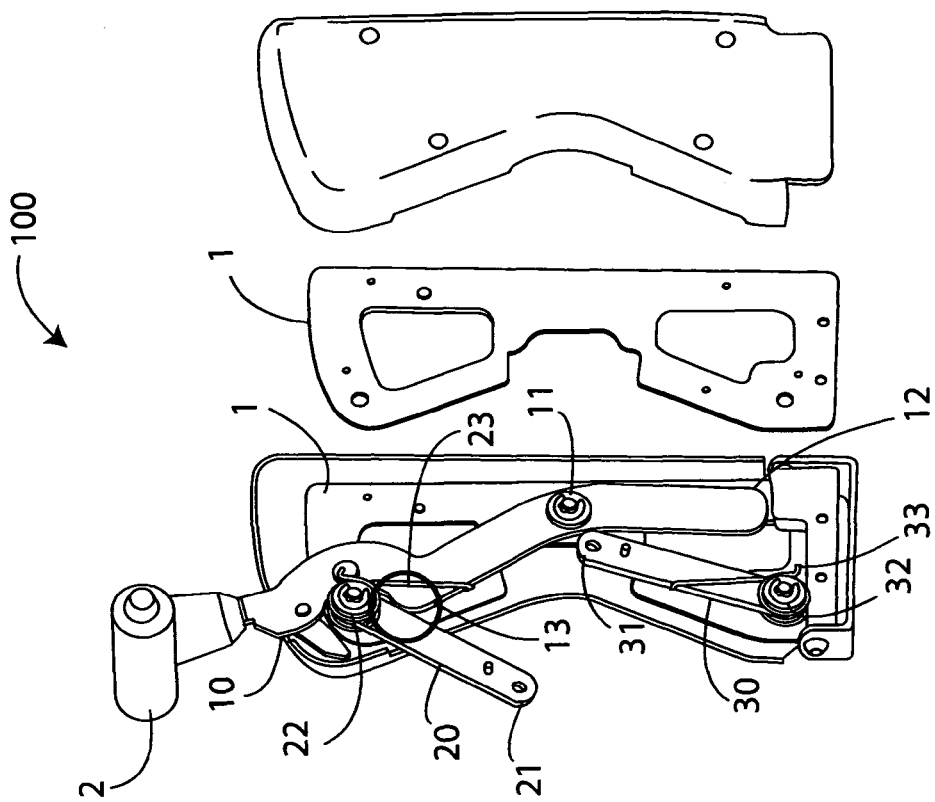
FIG. 4 schematically shows device according to the invention, from which outer housing has been removed, during operative braking step.
Figure 3:
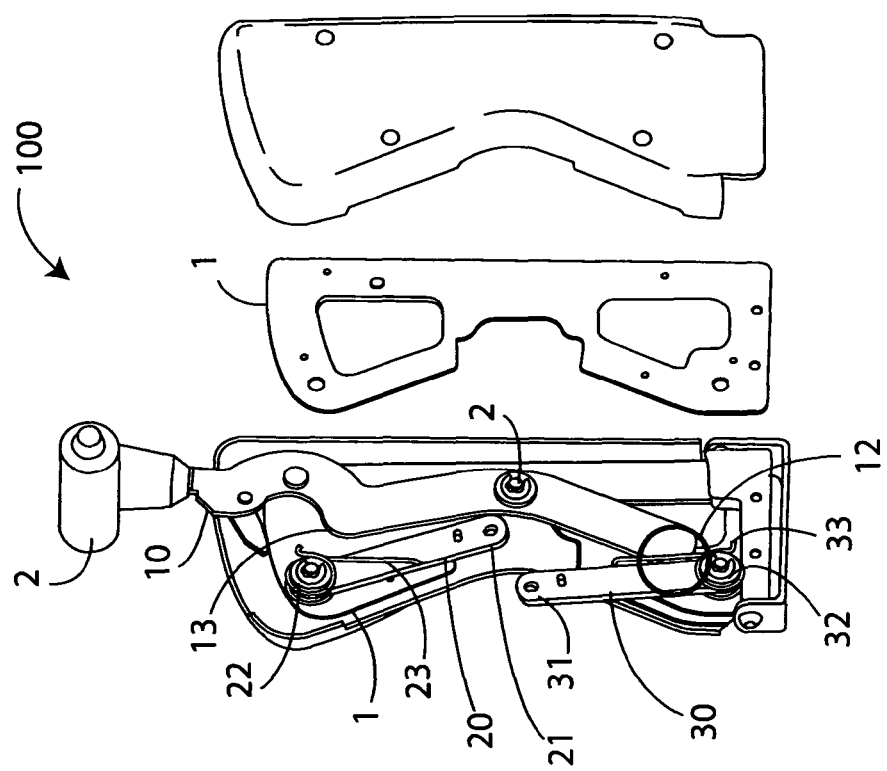
FIG. 3 schematically shows the device according to the invention, from which the outer housing has been removed, during an operative acceleration step.

As shown in the drawings, the manual device 100 according to the invention, comprises a body A comprised of two hemi-shells, within which there are provided a first lever 10 having an upper handgrip 2, a second lever 20, and a third lever 30, and a frame 1, that in the embodiment shown provides two elements, but that can be formed in a different way.

The first lever 10 is pivoted at a substantially central horizontal position 11 on said frame 1, so that, if the user exerts an action on said handgrip 2, first lever 10 can be displaced forward or backward.

The second lever 20 is pivoted at one of its ends above the pivot area 11 on said frame 1, at the point indicated by reference number 22. Upper part 13 of lever 10 is so shaped so as to interfere with said second lever 20, as an upper kinematic torque.

The third lever 30 is pivoted at the bottom of said frame 1, at the point indicated by reference number 32. Lower end 12 of said first lever 10 is so shaped to interfere with said lever, as an upper kinematic torque.

The free end of second lever 20 is coupled with rod 6 for operation of the brake, while free end of third lever 30 is coupled with rod 5 for operation of accelerator. Acceleration and braking systems will not be further described, since they are not a specific part of the invention.

Device 100 according to the invention is further provided with a bracket 3 for fixing to the vehicle. Particularly, in the solutions shown, fixing occurs on a bracket 7 that can be inserted through holes 4 formed on a frame supporting seat 8, so as to be able to adjust position of device 100 according to the driver's need.

Acting on handgrip 2 by pushing it backward in the present embodiment, i.e., pulling the lever 10 toward the user, the lower end 12 of lever 10 acts on lever 30, making it rotate with an excursion corresponding to the full accelerator stroke. Obviously, the user can tune the action, deciding when to accelerate or not. A return spring 33 is provided on pivoting point 32 of lever 30 for bringing lever 30 back into a rest position as soon as the pushing action is released from the same lever 10, thus preventing any risk that the vehicle is involuntarily accelerated.

Acting instead on handgrip 2 by pushing it forward, the upper end of lever 10 acts on lever 20, making it rotate about point 22 for a distance corresponding to the full brake stroke. Obviously, in this case too, the user can adjust the action, deciding when to apply the braking action. A return spring 23 is provided on pivoting point 22 of lever 20, bringing the lever 20 back to the rest position as soon as pushing exerted on the same lever 10 is released.

As it can be noted, device 100 according to the invention provides the user with a system which is very simple and operable with a single hand to accelerate and brake. Acceleration and braking direction can be obviously reversed. Furthermore, the device according to the invention is so constructed to ensure elimination of every acceleration force while braking, since to brake it is necessary to interrupt the acceleration action.

Advantageously, as previously stated, handgrip 2 can be provided with different controls, such as, for example, a brake blocking button, horn, or light operating controls.

Preferred embodiments of the invention have been described in the above, but it is to be understood that modifications and variations can be introduced by those skilled in the art without departing from the relevant scope as defined in the enclosed claims.

The invention claimed is:

1. A non-hydraulic manual device for controlling the brake and the accelerator of
 a vehicle, said device comprising:
 an enclosed body formed by two hemi-shells,
 a frame enclosed within said enclosed body,
 said enclosed body being coupled with the vehicle and remaining substantially without movement while the device is used;
a first lever, a second lever and a third lever,
 said first lever being provided with an upper handgrip, projecting from inside said body, and movable independently with respect to said body, and
 said first lever being pivotally mounted on said frame in a substantially central position on the frame, so that, when a force is exerted on said handgrip, the first lever is displaced forward or backward;
 said second lever being pivotally mounted on said frame at a point above the pivot point of the first lever, the free end of the second lever being coupled with brake operation means, said second lever being provided with elastic means for returning the second lever to a rest or neutral position, and the upper part of the first lever being shaped to interfere with said second lever;
 said third lever being pivotally mounted at the bottom of said frame, the lower end of said first lever being shaped to interfere with said third lever, said third lever being provided with elastic means for returning the third lever to a rest or neutral position, and the free end of the third lever being coupled with accelerator operation means.

2. The non-hydraulic manual device of claim 1 wherein said elastic means for returning said second and third levers to a rest or neutral position comprises a spring for each the second and third levers.

3. The non-hydraulic manual device of claim 1 or claim 2, wherein said non-hydraulic manual device is attached to the vehicle by a bracket that is inserted within holes formed into a frame of a seat within the vehicle.

4. The non-hydraulic manual device of claim 1 wherein said frame includes two elements positioned aside the lever assembly to permit the frame be attached into the frame of said seat.

5. The non-hydraulic manual device of claim 1 wherein pulling backward on said first lever provides acceleration and pushing forward on said first lever provides braking.

6. The non-hydraulic manual device of claim 1, wherein said handgrip on said first lever is provided with additional controls to operate a brake blocking button, a horn or lights.

* * * * *